United States Patent
Ren et al.

(10) Patent No.: US 10,970,073 B2
(45) Date of Patent: Apr. 6, 2021

(54) BRANCH OPTIMIZATION DURING LOADING

(71) Applicant: International Business Machines Corporation, Armonk, NY (US)

(72) Inventors: Qian Ren, Beijing (CN); Shan Gao, Beijing (CN); Xiao Hai Ma, Beijing (CN); Li Gao, Beijing (CN); Ting Ting Tang, Beijing (CN); Bin Chen, Beijing (CN); Zhuo Hua Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/149,511

(22) Filed: Oct. 2, 2018

(65) Prior Publication Data

US 2020/0104133 A1   Apr. 2, 2020

(51) Int. Cl.
*G06F 9/24* (2006.01)
*G06F 9/30* (2018.01)

(52) U.S. Cl.
CPC ............ *G06F 9/30058* (2013.01); *G06F 9/24* (2013.01); *G06F 9/30029* (2013.01)

(58) Field of Classification Search
CPC . G06F 9/38; G06F 9/3867; G06F 9/24; G06F 11/3612
See application file for complete search history.

(56) References Cited

U.S. PATENT DOCUMENTS

| | | | |
|---|---|---|---|
| 4,755,966 A | 7/1988 | Lee et al. | |
| 5,655,122 A | 8/1997 | Wu | |
| 5,659,752 A | 8/1997 | Heisch et al. | |
| 6,260,190 B1 * | 7/2001 | Ju | G06F 8/445 712/205 |
| 6,463,582 B1 * | 10/2002 | Lethin | G06F 9/45504 717/138 |
| 7,607,119 B2 | 10/2009 | Chilimbi et al. | |
| 8,291,398 B2 * | 10/2012 | Kawahito | G06F 8/4435 717/154 |
| 8,984,259 B2 | 3/2015 | Hulse et al. | |
| 9,009,681 B2 * | 4/2015 | Schmidt | G06F 8/443 717/130 |
| 2003/0101335 A1 * | 5/2003 | Gillies | G06F 9/30072 712/234 |
| 2004/0221281 A1 * | 11/2004 | Suganuma | G06F 8/41 717/151 |
| 2005/0268293 A1 * | 12/2005 | Kawahito | G06F 8/4434 717/154 |

(Continued)

OTHER PUBLICATIONS

Unknown, "6.57 Other Built-in Functions Provided by GCC," Using the GNU Compiler Collection (GCC): Other Builtins, https://gcc.gnu.org/onlinedocs/gcc/Other-Builtins.html, printed Jun. 28, 2018, 14 pgs.

(Continued)

*Primary Examiner* — Duy Khuong T Nguyen (74) *Attorney, Agent, or Firm* — Richard B. Thomas (57) ABSTRACT

The present disclosure provides a method, computer system and computer program product for branch optimization. According to the method, execution possibilities of instruction blocks corresponding to at least one branch of in a program can be determined. Then, the instruction blocks can be loaded according to the execution possibilities.

19 Claims, 7 Drawing Sheets

(56) References Cited

U.S. PATENT DOCUMENTS

| | | | |
|---|---|---|---|
| 2007/0055961 A1* | 3/2007 | Callister .................. | G06F 9/26 717/136 |
| 2011/0078424 A1* | 3/2011 | Boehm ............... | G06F 9/30094 712/234 |
| 2011/0099542 A1* | 4/2011 | Branda ............... | G06F 11/3089 717/154 |
| 2017/0123797 A1* | 5/2017 | Friedmann .......... | G06F 9/30072 |

OTHER PUBLICATIONS

Unknown, "3.11 Program Instrumentation Options," Using the GNU Compiler Collection (GCC): Instrumentation Options, https://gcc.gnu.org/onlinedocs/gcc/Instrumentation-Options.html#Instrumentation-Options, printed Jun. 28, 2018, 11 pgs.

Mell et al., "The NIST Definition of Cloud Computing," Recommendations of the National Institute of Standards and Technology, U.S. Department of Commerce, Special Publication 800-145, Sep. 2011, 7 pgs.

Patterson, J., "Accurate Static Branch Prediction by Value Range Propagation," Proceedings of the ACM SIGPLAN '95 Conference on Programming Language Design and Implementation, Jun. 1995, pp. 67-78.

Wikipedia, "Branch predictor," https://en.wikipedia.org/wiki/Branch_predictor, printed Jun. 28, 2018, 10 pgs.

* cited by examiner

BRANCH OPTIMIZATION DURING LOADING

BACKGROUND

The present invention relates to computer systems, and more specifically, to branch optimization during loading of programs.

Software performance improvement is a key requirement of many systems, even though computer hardware is becoming more and more powerful. To improve software performance, program optimization plays an important role.

SUMMARY

According to one embodiment of the present invention, there is provided a computer-implemented method. According to the method, execution possibilities of instruction blocks corresponding to at least one branch comprised in a program can be determined. Then, the instruction blocks can be loaded according to the execution possibilities.

According to another embodiment of the present invention, there is provided a computer system. The computer system comprises a processor, a computer-readable memory coupled to the processor. The computer-readable memory comprises instructions that when executed by the processor perform actions of: determining execution possibilities of instruction blocks corresponding to at least one branch comprised in a program; and loading the instruction blocks according to the determined execution possibilities.

According to another embodiment of the present invention, there is provided a computer program product. The computer program product comprises a computer readable storage medium having program instructions embodied therewith, the program instructions executable by a processor to cause the processor to perform actions of: determining execution possibilities of instruction blocks corresponding to at least one branch comprised in a program; and loading the instruction blocks according to the determined execution possibilities.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Branches (e.g., if statements, switch statements) are widely used in computer programming, and branch optimization is a vital aspect to improving program efficiency. Optimizing branches can reduce execution of jump and comparison instructions, which are resource and time intensive operations. Currently, branch optimization solutions require recompiling the source code based on profile data, or the program executable file is optimized statically or at runtime. However, recompiling source code brings extra effort for a user, takes additional time/resources, and is not convenient when the program is distributed to multiple users, where each user will have to recompile the application. Optimizing program executable files, either statically or at runtime, usually consumes a large amount of system resources, like CPU and memory, so it may not be suitable for resource limited scenarios.

Embodiments of the present disclosure can address the above problem by introducing a method to do branch optimization based on program profiling during program load time. In some embodiments, for an if-else statement, besides generating instructions of the conditional expression, the compiler also inverts the condition and the inverted conditional expression will also be compiled into instructions which are saved into the program executable file. Two types of loading are introduced: 'load for profiling' and 'load for optimization'. When an executable file is loaded for profiling, instrumented instructions will be loaded by the loader and profile data of each branch is collected during program execution. When the executable file is loaded for optimization and an if statement is loaded, the loader will check the profile data to determine whether the original conditional expression or the inverted conditional expression needs to be loaded into memory. If the inverted conditional expression is loaded, the loader will swap the instructions of if statements and else statements. This method can also be applied to optimizing switch-case statements.

In this way, a branch (e.g., if-else statement or switch-case statement) is optimized during program load time without recompiling source code or optimizing the program binary. Accordingly, fewer system resource are used to optimize the program.

In some embodiments, at compilation time, the compiler generates a profiling module and a production module in the compiled program. The profiling module includes instrumentation codes for select (e.g., user-selected) branches to record profiling data of how many times each branch is executed. The profiling data can be, for example, a total hit counts, a monthly hit counts, a weekly hit counts, or any other statistical form of data.

In some embodiments, the production module does not contain the instrumented code for profiling. Instead, when it is compiled, the production module has the same sequence of instructions in branches as in profiling module. The locations of each branch in the profiling module and the production module are recorded in a global mapping table. Additionally, the statistic hit counts of each branch are recorded in other profiling data tables. These tables could be saved in the program's binary file or in separate files.

When loading a program for profiling, the profiling module will be loaded to run, and profiling data will be collected. When loading a program for production, the production module with optimized branch code will be loaded to run.

When loading a production program, the instructions of branches will be copied from the profiling module and filled into the production module as needed. This is done by the loader based on the global mapping table and profiling data to decide if the instructions in a branch need to be reloaded and if instructions in TRUE and FALSE block need to be swapped. If a swap needs to occur, the jump instruction need to be adjusted to opposite logic (e.g., je→jne, jle→jg, etc.). Extra compiler '#pragma branch' instructions or language syntax are introduced to control the optimization behavior for each branch in the user's source code.

It is to be understood that the aforementioned advantages are example advantages and should not be construed as limiting. Embodiments of the present disclosure can contain all, some, or none of the aforementioned advantages while remaining within the spirit and scope of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
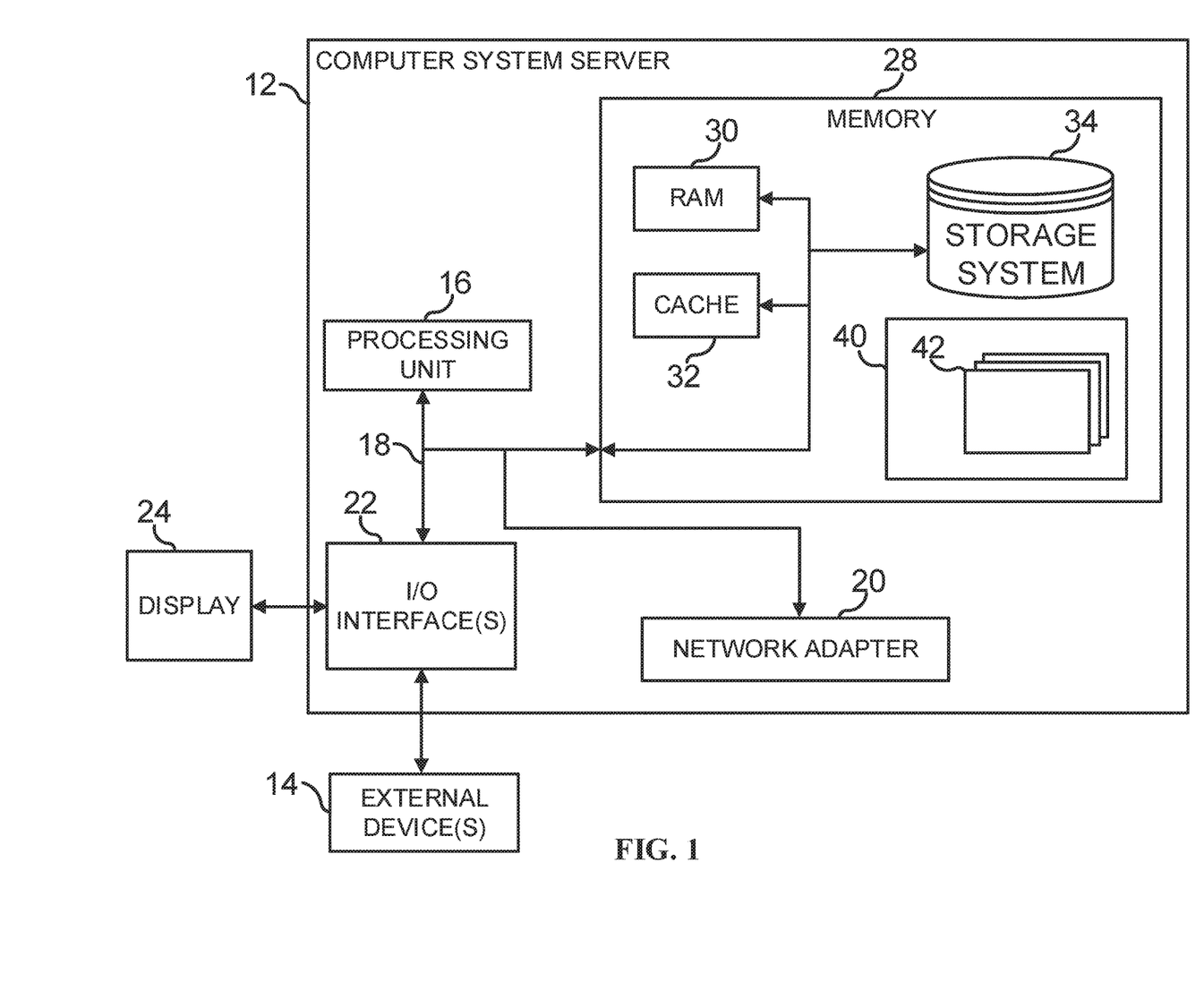
FIG. 1 depicts a cloud computing node, in accordance with embodiments of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
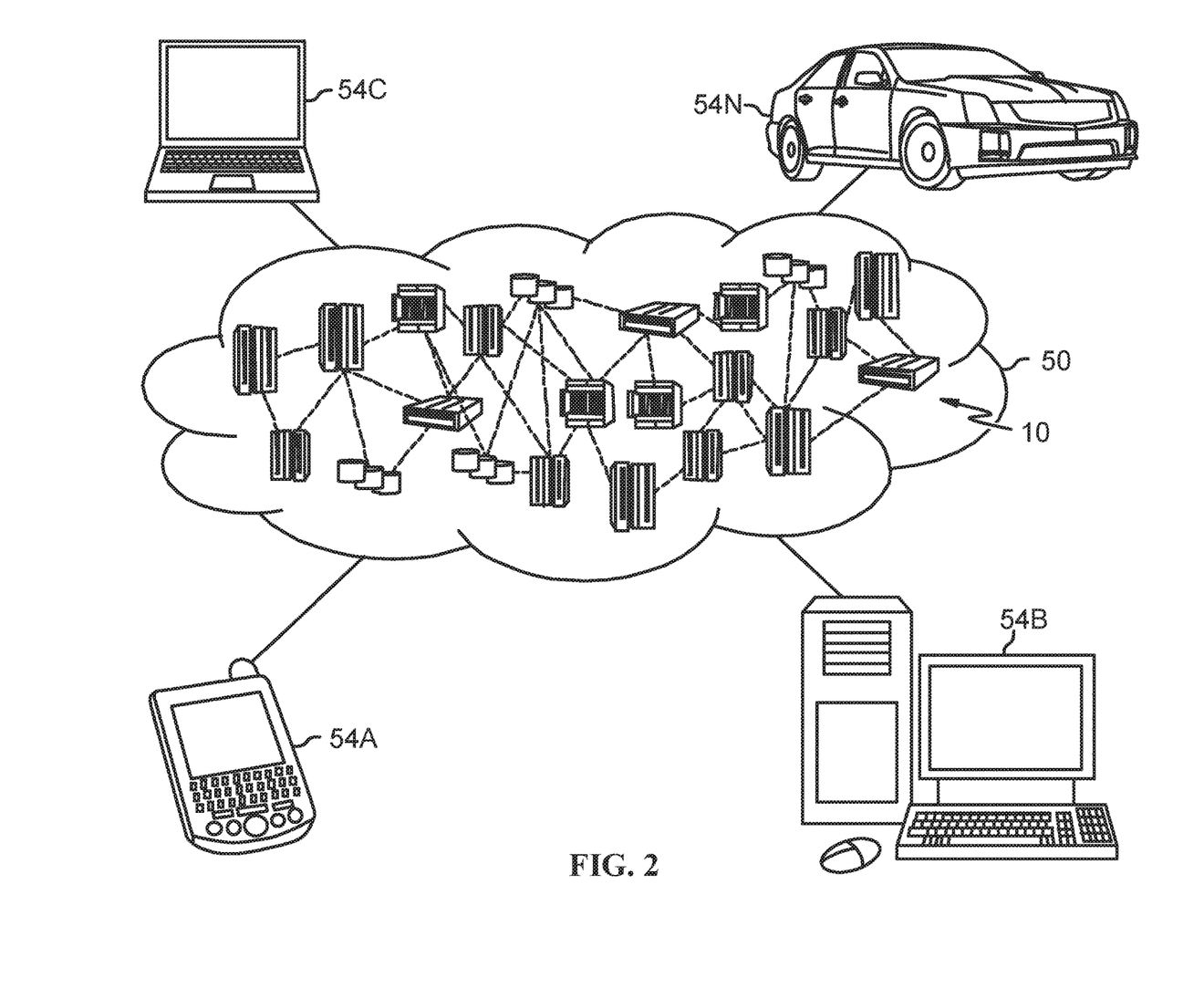
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
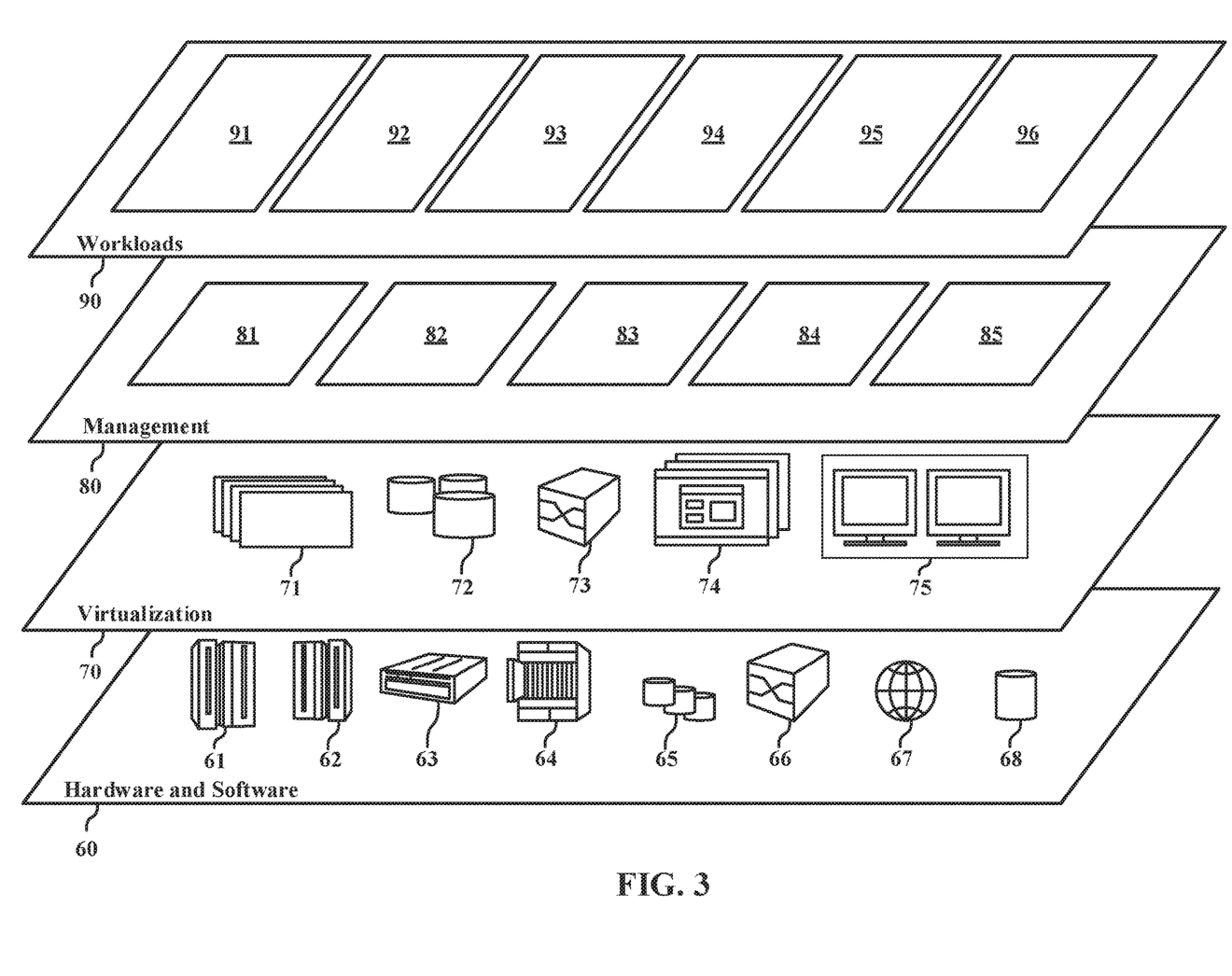
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and branch optimization 96.

Branches (for example, "if" statements, "switch" statements) are widely used in a program, and branch optimization is an important part of program optimization. Each of the branches may correspond to a block of source codes. Branch optimization can reduce resource costs of jump and/or condition instructions obtained after compilation of source codes of the branches. Currently, in some optimization solutions, source codes of the program need to be re-compiled. However, re-compilation of source codes requires extra efforts and is not a convenient way if the program is distributed to many different users.

Embodiments of the present disclosure provide a method, computer system, and computer program product for branch optimization during loading of programs.

According to embodiments of the present disclosure, source codes of the program can be written in any combination of one or more programming languages. One or more branches in the program can be determined based on analyzation of the source codes.

According to embodiments of the present disclosure, a branch included in the program may correspond to a block of source codes to be compiled. For example, the branch can correspond to "if" statements, etc.

An example "if" statement can be:

```
if (a > 0)
    x = 100;
else
    x = 200;
``` where "a" and "x" are variables in the source codes. This example "if" statement will be referred to as Example Branch 1 hereinafter.

Another example "if" statement can be:

```
if (a > 0)
    x = 100;
else if (a < -1)
    x = 300;
else
    x = 200;
``` where "a" and "x" are variables in the source codes. This example "if" statement will be referred to as Example Branch 2 hereinafter.

According to embodiments of the present disclosure, a branch in the program may correspond to other types of statements, such as "switch" statements, etc.

An example "switch" statement can be:
switch (a)

```
{
    case 100:   return 1;
    case 200:   return 2;
    case 300:   return 3;
    default:    return 0;
}
``` where "a" is a control variable in the source codes. This example "switch" statement will be referred to as Example Branch 3 hereinafter.

Figure 4:
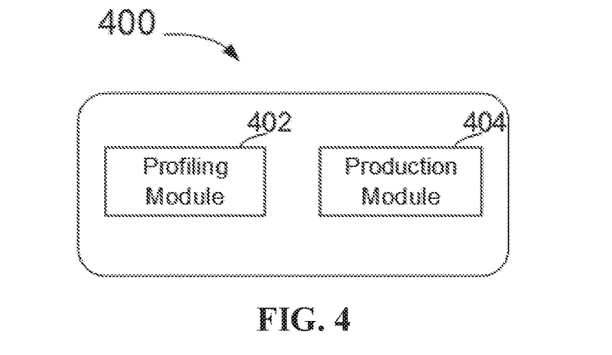
FIG. 4 depicts a schematic diagram of an example program structure 400, in accordance with embodiments of the present disclosure.

Referring now to FIG. 4, depicted is a schematic diagram of an example program structure 400, in accordance with embodiments of the present disclosure. During or after compilation of source codes of the program, a profiling module 402 and a production module 404 can be generated for the program. It shall be understood that the above-mentioned modules are just for description of the present disclosure, and the present disclosure is not limited to comprising only these modules. Other modules can also be generated, and a module can be combined with another module or divided into a plurality of sub modules.

According to embodiments of the present disclosure, profiling module 402 may include condition instruction blocks and content instruction blocks corresponding to each result of at least one branch in the program. The condition instruction blocks and content instruction blocks can be obtained after compilation of sources codes of the program.

As an example, logic expressions in Example Branch 1 include "if (a>0)" and "else," and profiling module 402 can include condition instruction blocks corresponding to logic expressions "if (a>0)" and "else." In some embodiments, if the last logic expression is a default expression (for example, logic expression "else"), the condition instruction block of logic expression "else" can be omitted, so profiling module 402 may include only the condition instruction block corresponding to logic expression "if (a>0)."

In this example, there will be two content instruction blocks respectively corresponding to each of the logic expressions. Each of the content instruction blocks respectively include instructions to be executed corresponding to logic expressions "if (a>0)" and logic expression "else" during the execution of the program. The content instruction blocks can include instructions obtained after compilation of source codes "x=100" and "x=200." As an example, if a content instruction block related to logic expressions "if (a>0)" is executed during the execution of the program, execution result of Example Branch 1 can be referred to as Result 1, and if a content instruction block related to logic expressions "else" is executed, execution result of Example Branch 1 can be referred to as Result 2.

In some embodiments, more than two logic expressions can be in a branch of the program. As an example, logic expressions in Example Branch 2 include "if (a>0)", "else if (a <−1)" and "else", and profiling module 402 can include condition instruction blocks of logic expressions "if (a>0)" and "else if (a<−1)", and three content instruction blocks corresponding to the logic expressions. As an example, if a content instruction block related to logic expressions "if (a>0)" is executed during the execution of the program, execution result of Example Branch 2 can be referred to as Result 1, if a content instruction block related to logic expressions "else if (a<−1)" is executed, execution result of Example Branch 2 can be referred to as Result 2, and if a content instruction block related to logic expressions "else" is executed, execution result of Example Branch 2 can be referred to as Result 3.

As another example, logic expressions in Example Branch 3 include "case 100", "case 200", "case 300", and "default", and profiling module 402 can include condition instruction blocks of the logic expressions and content instruction blocks corresponding to the condition instruction blocks. As an example, if a content instruction block related to logic expressions "case 100" is executed during the execution of the program, execution result of Example Branch 3 can be referred to as Result 1, if a content instruction block related to logic expressions "case 200" is executed, execution result of Example Branch 3 can be referred to as Result 2, if a content instruction block related to logic expressions "case 300" is executed, execution result of Example Branch 3 can be referred to as Result 3, and if a content instruction block related to logic expressions "default" is executed, execution result of Example Branch 3 can be referred to as Result 4.

Extra instructions can also be inserted to profiling module 402 to collect profiling data. In parallel with execution of the program, the profiling data can be collected and recorded in a table. The profiling data may include at least one entry for the one or more branches in the program.

For a branch, one or more entries in the table can be used to indicate possibilities of different results of the branch. It shall be understood that in some embodiments, as the number of the results can be more than two, possibilities of the more than two results can all be recorded in the table.

According to embodiments of the present disclosure, the table can also include possibilities of the instruction blocks and corresponding results. For example, possibilities of different instruction blocks can be predicted based on history statistics data, running location of the program, running time of the program, and/or other parameters. It shall be understood that the present disclosure is not limited to those mentioned parameters, any now-known or to be developed prediction algorithm can be used to determine possibilities of the instruction blocks. Table 1 is an example table recording profiling data for Example Branch 1. In this example, for Result 1 and Result 2 of Example Branch 1, execution possibilities of corresponding instruction blocks are respectively 40% and 60%.

TABLE 1

| Branches | Execution Results | Possibilities |
|---|---|---|
| 1 | 1 (a > 0) | 40% |
| 1 | 2 (a ≤ 0) | 60% |
| ... | ... | ... |

Table 2 is an example table recording profiling data for Example Branch 2. In this example, for Result 1, Result 2, and Result 3 of Example Branch 2, possibilities of corresponding instruction blocks are respectively 20%, 60%, and 20%.

TABLE 2

| Branches | Execution Results | Possibilities |
|---|---|---|
| 2 | 1 (a > 0) | 20% |
| 2 | 2 (a < −1) | 60% |
| 2 | 3 (−1 ≤ a ≤ 0) | 20% |
| ... | ... | ... |

Table 3 is an example table recording profiling data for Example Branch 3. In this example, for Result 1, Result 2, Result 3, and Result 4 of Example Branch 3, possibilities of corresponding instruction blocks are respectively 10%, 20%, 40%, and 30%.

TABLE 3

| Branches | Execution Results | Possibilities |
|---|---|---|
| 3 | 1 (case 100) | 10% |
| 3 | 2 (case 200) | 20% |
| 3 | 3 (case 300) | 40% |
| 3 | 4 (default) | 30% |
| ... | ... | ... |

According to embodiments of the present disclosure, the profiling data can include execution counts of the instruction blocks. In some embodiments, the profiling data can include execution result counts of the branch. The execution counts can be used to represent execution possibilities of instruction blocks. During running of the program, as actual result of the branch can be determined, and a specific condition instruction block and/or content instruction block related to the actual result will be executed. Execution counts of the specific condition instruction block and/or content instruction block can be increased in response to the execution of specific content instruction block. Table 4 is another example table recording profiling data for Example Branch 1. In this example, for Result 1 and Result 2 of Example Branch 1, execution counts of corresponding instruction blocks are respectively 200 and 300. In this example, possibilities of instruction blocks related to Result 2 will be higher than possibilities of instruction blocks related to Result 1.

TABLE 4

| Branches | Execution Results | Counts |
|---|---|---|
| 1 | 1 (a > 0) | 200 |
| 1 | 2 (a ≤ 0) | 300 |
| ... | ... | ... |

According to embodiments of the present disclosure, content instruction blocks with different execution possibilities can be loaded from profiling module 402 to production module 404. The loaded instruction blocks in production module 404 are ranked according to the possibilities. For example, a content instruction block in a branch with a higher possibility can be loaded as a first content instruction block in production module 404, and another content instruction block in the branch with a lower execution possibility can be loaded as a second content instruction block in production module 404. The first content instruction block is prior to the second content instruction block in production module 404 and can be executed by one or more processors before the second content instruction block.

According to embodiments of the present disclosure, condition instruction blocks can also be loaded to production module 404 according to the possibilities. The condition instruction blocks can be loaded to production module 404 in a place related to corresponding instruction blocks. For example, a condition instruction block related to a content instruction block with a higher execution possibility can be loaded as a first condition instruction block in production module 404 and can be executed by processors before another condition instruction block corresponding to a lower execution possibility (if one exists) in production module 404. In this example, the loaded first condition instruction block and the first content instruction block both can be referred to as at least parts of a first instruction block.

According to embodiments of the present disclosure, as the last condition instruction block of logic expressions can be omitted in profiling module 402, the omitted condition instruction block can be stored in a file of the program. Therefore, if a content instruction block related to the omitted condition instruction block has a higher execution possibility and will be loaded to a prior place in production module 404, the omitted condition instruction block can be obtained from the file and loaded to production module 404. In some embodiment, the condition instruction blocks related to a content instruction block with a higher execution possibility can be generated based on condition instruction blocks included in profiling module 402 and then loaded to production module 404.

Figure 5:
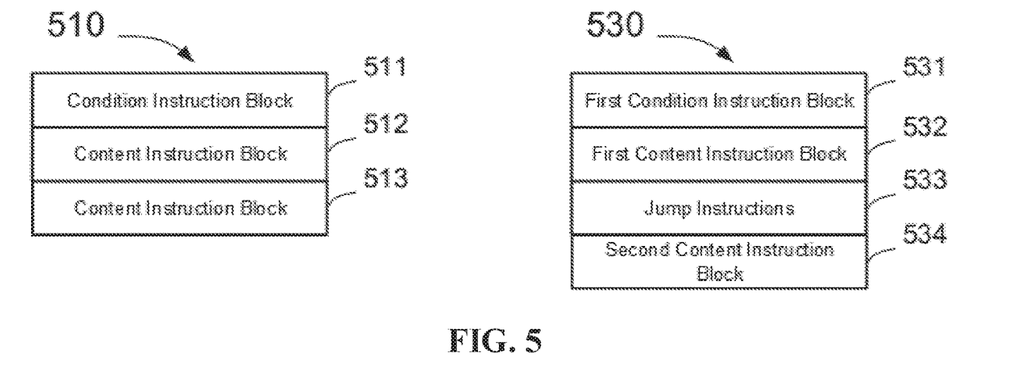
FIG. 5 depicts a schematic diagram of example instruction blocks in a profiling module and a production module, in accordance with embodiments of the present disclosure.

Referring now to FIG. 5, example instruction blocks 510 and 530 in a profiling module and a production module are depicted. As an example, instruction block 510 may correspond to Example Branch 1, and include condition instruction block 511 (for example, condition instruction block corresponding to condition "if (a>0)"), content instruction block 512 (obtained after compilation of source codes "x=100"), and content instructions block 513 (obtained after compilation of source codes "x=200"). Instruction block 510 can be included in profiling module 402. In this example, the condition instruction block related to content instruction block 513 is omitted. In some embodiments, extra instructions (for collecting profiling data related to each result of Example Branch 1), and/or jump instructions for skipping content instructions block 534 can also be included in instruction block 510.

Content instruction blocks 512 and 513 can be loaded to instruction block 530 in production module 404. The loading can be implemented according to execution possibilities of content instructions block 512 and 513. As an example, the execution possibilities of content instructions block 512 and 513 can respectively be 40% and 60%. In this example, the first condition instruction block 531 can be obtained from a file storing omitted condition instructions according to the identity of Example Branch 1 or generated based on condition instruction block 511. In some other embodiments, condition instruction block 531 can be obtained by implement a logic negation on logic expression ("if (a>0)") which is related to condition instruction block 511 to obtain logic expression "if (a≤0)", and obtaining instructions corresponding to logic expression "if (a≤0)". Content instruction block 513 can be loaded as the first content instruction block 532, and content instruction block 512 can be loaded as the second instruction block 534. In this example, the first condition instruction block 531 and the first content instruction block 532 can be referred to as parts of first instruction block. Jump instructions 533 can be used to skip the second instruction block 534 and can be determined according to the length of the second instruction block 534 or the ending of instructions of Example Branch 1 in production module 404. In some embodiments, extra instructions (for collecting profiling data related to Result 1 and Result 2) can also be included in instruction block 530.

In response to the loading, instruction block 530 can be accessed and implemented by one or more processors. As a content instruction block and/or a condition instruction block in a branch with a higher execution possibility can be accessed and implemented with a higher priority, efficiency and performance of the program can be improved.

Figure 6:
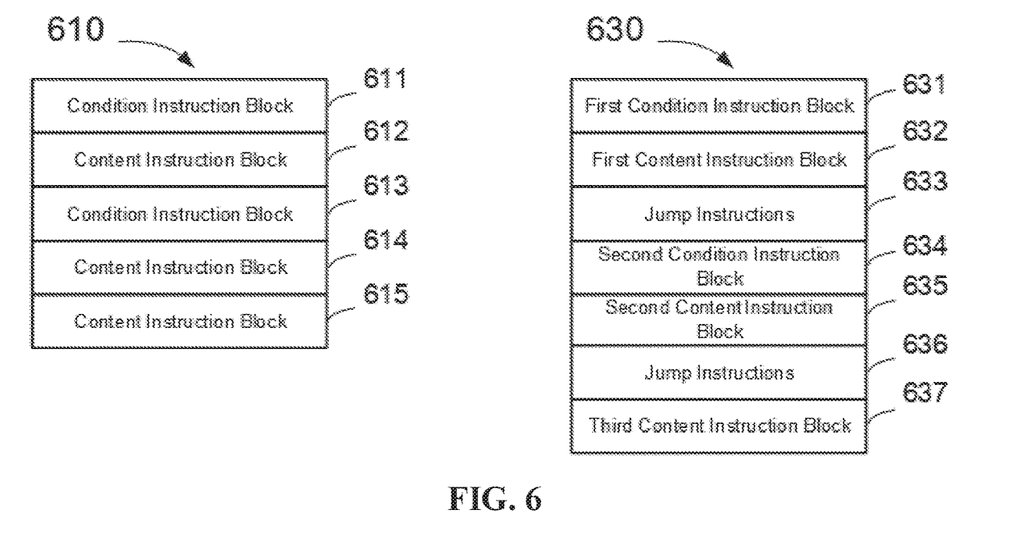
FIG. 6 depicts another schematic diagram of example instruction blocks in a profiling module and a production module, in accordance with embodiments of the present disclosure.

Referring now to FIG. 6, example instruction blocks 610 and 630 in a profiling module and a production module are depicted. As an example, instruction block 610 may correspond to Example Branch 2, and include condition instruction block 611 (for example, condition instructions corresponding to condition "if (a>0)"), content instruction block 612 (obtained after compilation of source codes "x=100"), condition instruction block 613 (for example, condition instructions corresponding to condition "else if (a<−1)"), content instruction block 614, and content instruction block 615. Instruction block 610 can be included in profiling module 402. In this example, the condition instruction block related to content instruction block 615 is omitted. In some embodiments, extra instructions (for collecting profiling data related to each result of Example Branch 2), and/or jump instructions for skipping some instructions can also be included in instruction block 610.

Content instruction block 612, 614 and 615 can be loaded to instruction block 630 in production module 404. The loading can be implemented according to execution possibilities of content instructions block 612, 614 and 615. For example, execution possibilities of content instructions block 612, 614 and 615 can respectively be 20%, 60% and 20%. In this example, the first condition instruction block 631 can be obtained by coping condition instructions 613, and content instruction block 614 can be loaded as the first content instruction block 632. In this example, the first condition instruction block 631 and the first content instruction block 632 can be referred to as at least parts of first instruction block.

As execution possibilities of content instruction blocks 612 and 615 are equal, so any one of content instruction blocks 612 and 615 can be loaded as the second content instruction block 635 and the other one can be loaded as the third content instruction block 637. Jump instructions 633 can be determined according to the length of the second condition instruction block 634, the second content instruction block 635, jump instructions 636 and the third content instruction block 637. Jump instructions 636 can be determined according to the length of the third content instruction block 637. In some embodiments, jump instructions 633 and 636 can also be determined according to the ending of instructions of Example Branch 1 in production module 404. In this example, the second condition instruction block 634 and the second content instruction block 635 can be referred to as at least parts of second instruction block.

As an example, if content instruction block 612 is to be loaded as the second content instruction block 635, condition instruction block 634 can be obtained by coping condition instruction block 611. In this example, content instruction block 615 can be loaded as the third content instruction block 637.

As another example, if content instruction block 615 is to be loaded as the second content instruction block 635, condition instruction block 634 can be obtained from a file storing condition instruction blocks according to the identity of Example Branch 2 or generated based on condition instruction blocks 611 and 613. In some embodiments, condition instruction block 634 can be obtained by determining a logic expression opposite to the logic expressions "a>0" and "a<−1", and compiling the source codes, such as "if (−1≤a≤0)". In this example, content instruction block 612 can be loaded as the third content instruction block 637.

In response to the loading, instruction block 630 can be accessed and implemented by one or more processors.

Figure 7:
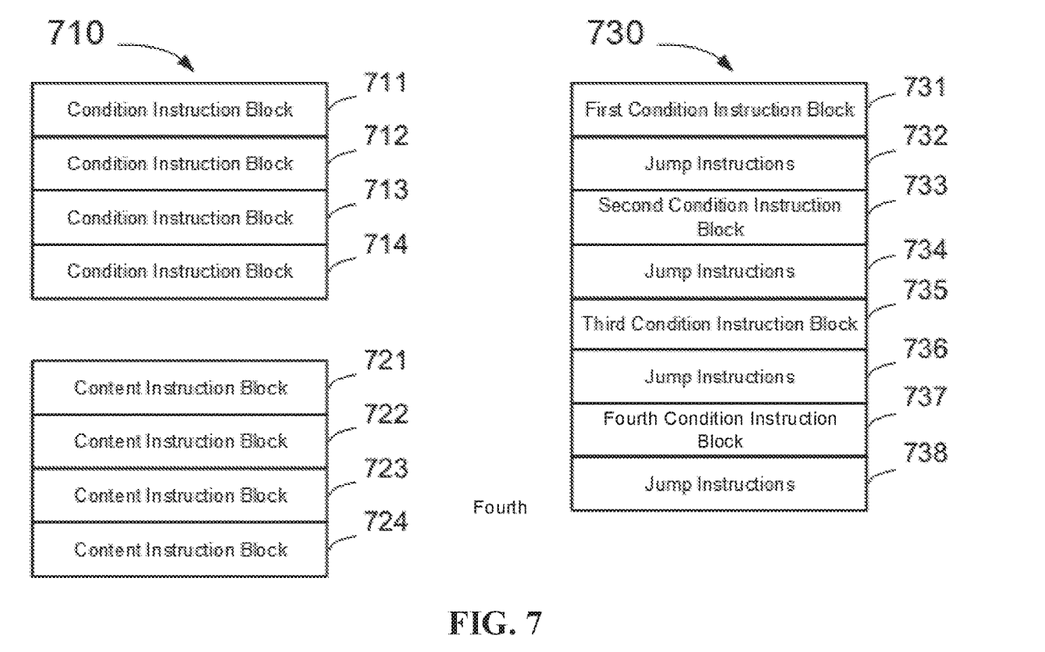
FIG. 7 depicts another schematic diagram of example instruction blocks in a profiling module and a production module, in accordance with embodiments of the present disclosure.

Referring now to FIG. 7, example instruction blocks 710 and 730 in a profiling module and a production module are depicted. As an example, instruction block 710 may correspond to Example Branch 3, and includes condition instruction block 711 (for example, condition instruction block corresponding to condition "case 100"), condition instruction block 712 (for example, condition instruction block corresponding to condition "case 200"), condition instruction block 713 (for example, condition instruction block corresponding to condition "case 300"), and condition instruction block 714 (for example, condition instruction block corresponding to condition "default"). Condition instruction blocks 711-714 are obtained in response to compiling sources codes of Example Branch 3.

Instruction block 710 can be included in profiling module 402. In some embodiments, extra instructions (for collecting profiling data related to each result of Example Branch 3), and/or jump instructions (for jumping to some instruction not following the jump) instructions can also be included in instruction block 710.

According to embodiments of the present disclosure, content instruction blocks 721-724 can also be obtained after the compilation and then stored in profiling module 402 or another module in the program files. Each of content instruction blocks 721-724 respectively corresponds to each of condition instruction blocks 711-714. As an example, content instruction block 721 may include instructions for "return 1", content instruction block 722 may include instructions for "return 2", content instruction block 723 may include instructions for "return 3", and content instruction block 724 may include instructions for "return 0".

Each of condition instruction blocks 711-714 can be loaded to instruction block 730 in production module 404. The loading can be implemented according to execution possibilities of condition instruction blocks 711-714. For example, execution possibilities of condition instruction block 711, block 712, block 713 and block 714 can respectively be 10%, 20%, 40% and 30%. In this example, condition instruction block 713 can be loaded as first condition instruction block 731; condition instruction block 714 can be loaded as second condition instruction block 733; condition instruction block 712 can be loaded as third condition instruction block 735; and condition instruction block 711 can be loaded as fourth condition instruction block 737

According to embodiments of the present disclosure, content instruction blocks 721-724 can also be loaded to instruction block 730. Jump instructions 732 can be determined according to the location of the loaded content instruction block 723 in production module 404, jump instructions 734 can be determined according to the location of the loaded content instruction block 724 in production module 404, jump instructions 736 can be determined according to the location of the loaded content instruction block 722 production module 404, and jump instructions 738 can be determined according to the location of the loaded content instruction block 721 in production module 404.

In response to the loading, instruction block 730 can be accessed and implemented by one or more processors.

Figure 8:
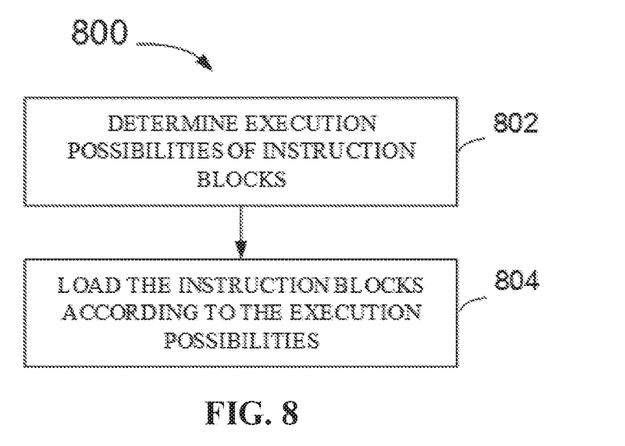
FIG. 8 depicts a flow chart of an example method for branch optimization, in accordance with embodiments of the present disclosure.

A method 800 for branch optimization according to embodiments of the present disclosure will be discussed with reference to FIG. 8. The method 800 can be implemented by the cloud computing node 10. The method 800 is only illustrative and is not intended to suggest any limitation as to the scope of use or functionality of embodiments of the disclosure described herein.

At 802, execution possibilities of instruction blocks corresponding to at least one branch included in a program can be determined. Then at 804, the instruction blocks can be loaded according to the execution possibilities.

Figure 9:
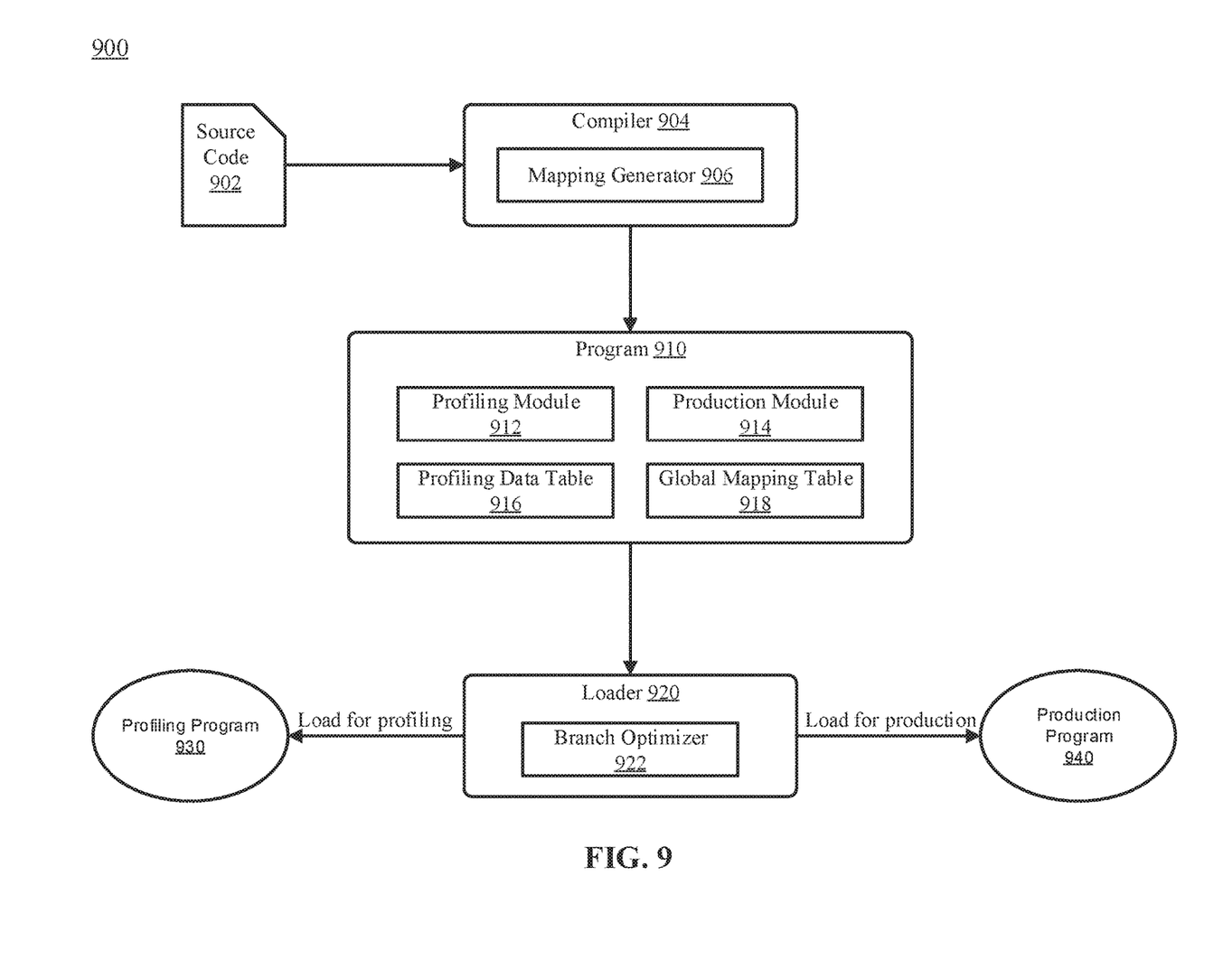
FIG. 9 depicts an example computing structure, in accordance with embodiments of the present disclosure.

Referring now to FIG. 9, depicted is an example computing structure 900, in accordance with embodiments of the present disclosure. The computing structure 900 may be one or more subcomponents of a larger computing device (e.g., computer system 12 shown in FIG. 1). For example, the computing structure 900 may be embodied within a CPU and/or memory. The computing structure 900 may include a compiler 904, a program 910, and a loader 920.

The compiler 904 may be configured to load source code 902 and generate an executable program file (e.g., object code or binary for program 910). Furthermore, the compiler 904 may be configured to add, during compilation, a profiling module 912, a production module 914, a profiling data table 916, and a global mapping table 918 to the object code generated for the program 910. The compiler 904 may use a mapping generator 906 to create one or more of the profiling module 912, the production module 914, the profiling data table 916, and the global mapping table 918. The profiling data table 916 and global mapping table 918 may be used for load-time optimization of the program 910.

The profiling module 912 may include instrumentation code to record profiling data for branches in the program 910. The instrumentation code may be added to the profiling module 912 by the compiler 904. In some embodiments, the profiling data include data on how many times each branch (or a subset of selected branches) in the program 910 is executed. For example, the profiling data may include total hit counts for one or more branches, monthly hit counts for one or more branches, weekly hit counts for one or more branches, etc.

In some embodiments, the production module 914 does not contain instrumentation code for recording profiling data. Instead, the production module 914 may include the same sequence of instructions in branches as contained in the profiling module. The locations of each branch in the profiling module 912 and the production module 914 are recorded in the global mapping table 918. The statistics about the branches (e.g., the hit counts recorded by the profiling module) are stored in the profiling data table(s) 916.

In some embodiments, the global mapping table 918 includes compile-time and run-time data relating to the program 910, and to various branches within the program 910. For example, the global mapping table 918 may include one or more of branch numbers, branch addresses in the profiling module 912 (e.g., the address of the 'cmpl' instruction in the text section of the profiling module), branch addresses in the production module 914 ((e.g., the address of the 'cmpl' instruction in the text section of the production module), TRUE branch lengths (e.g., the length of instructions in the TRUE branch in the profiling module), FALSE branch lengths (e.g., the length of instructions in the FALSE branch in the profiling module), a last state for one or more branches (e.g., whether the branch was swapped or not and whether it was intended to be swapped or not), and profiling data (e.g., a pointer to the profiling data table(s) 916). The global mapping table 918 may be stored in the program's 910 static data section or in a separate file.

The loader 920 may be configured to perform two different types of loading: loading for profiling (e.g., to generate a profiling program 930) and loading for production (e.g., to generate a production program 940). When loading the program 910 for profiling, the loader 920 loads the profiling module 912 for execution. During execution, the profiling module 912 collects profiling data. When loading the program 910 for production, the loader 920 loads the production module 914 with optimized branch code (e.g., as determined by the branch optimizer 922) for execution.

During loading for production, the loader 920 copies the instructions of branches from the profiling module 912 into the production module 914, as needed. In some embodiments, the loader 920, executing the branch optimizer 922, uses the global mapping table 918 and the profiling data table(s) 916 to determine which, if any, instructions in a branch need to be reloaded. The loader 920 also may determine whether if-instructions in TRUE and FALSE blocks needs to be swapped. If an if-instruction needs to be swapped, the jump instructions also need to be adjusted to opposite logic (e.g., je→jne, jle→jg, etc.).

Figure 10:
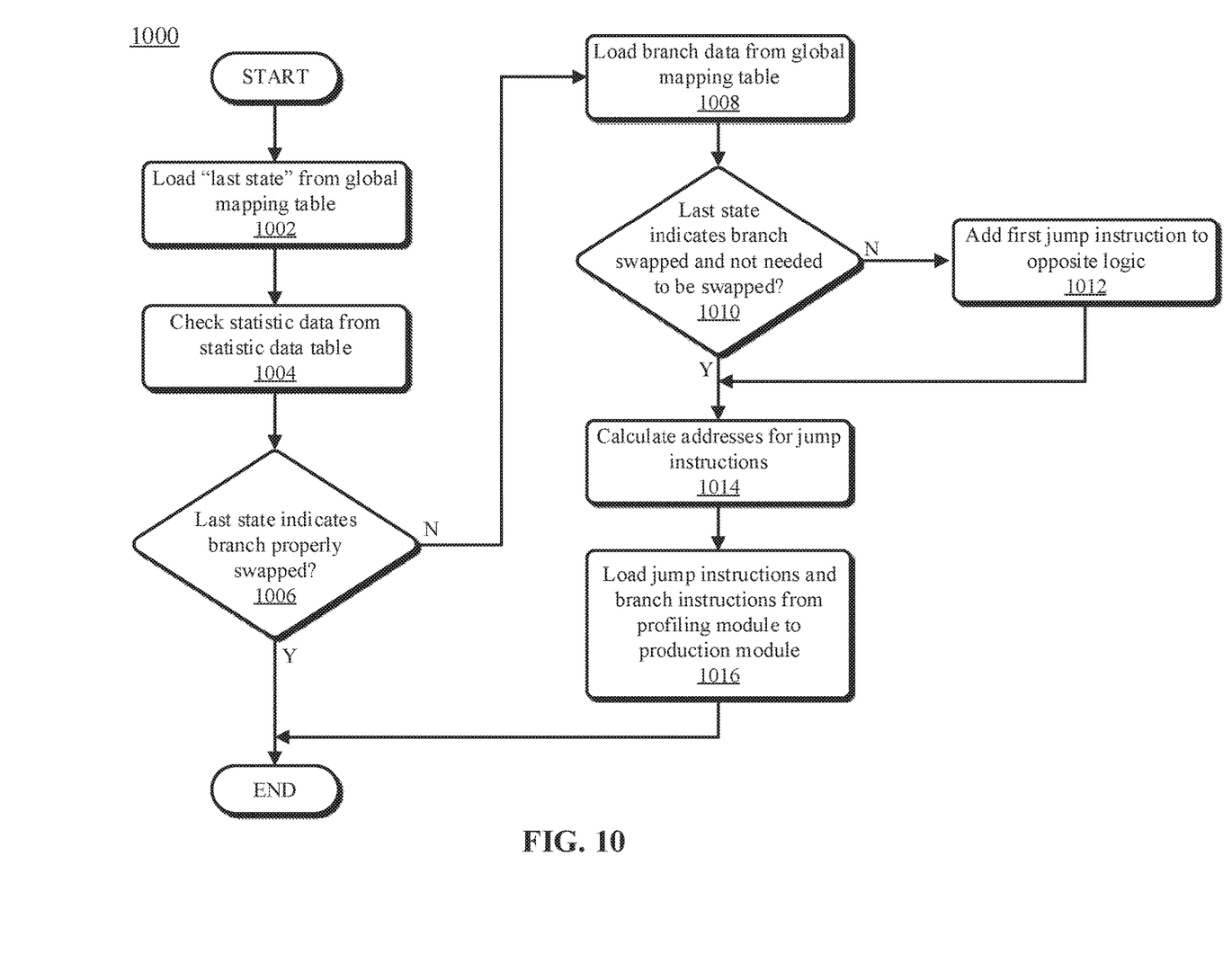
FIG. 10 depicts a flow chart of an example method for loading instructions for a branch, in accordance with embodiments of the present disclosure.

Referring now to FIG. 10, depicted is a flow chart of an example method 1000 for loading instructions for a branch, in accordance with embodiments of the present disclosure. In some embodiments, the method 1000 may be performed by a computer processor. For example, the method 1000 may be performed by an application/program loader executing instructions within a computer system (e.g., computer system 12 shown in FIG. 1). In some embodiments, the method 1000 may begin at operation 1002, where responsive to loading a program, the "last state" for a branch is loaded from a global mapping table.

At operation 1004, the processor may check statistical data for the branch using a statistic data table. Based on the statistical data, the process may determine, at decision block 1006, whether the last state indicates that the branch was properly swapped. For example, the processor may determine whether the last state was one of "swapped and needing to be swapped" or "not swapped and not needing to be swapped." If the last state indicates that the branch was properly swapped, the method 1000 may end. Otherwise, the method may progress to operation 1008, where the processor may load branch data from the global mapping table.

At decision block 1010, the processor may determine whether the last state indicates that the branch is "swapped and not needing to be swapped." If not (e.g., if the last state is "not swapped and needing to be swapped"), the processor may add a first jump instruction to the opposite logic at operation 1012. For example, the processor may swap the branch back to its un-swapped value.

At operation 1014, the processor may calculate addresses for jump instructions. At operation 1016, the processor may load jump instructions and branch instructions from the profiling module to the production model, and the method may end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    compiling, at a compile time, a first instruction block corresponding to a first result;
    compiling, at the compile time, a second instruction block corresponding to a second result, the first result different from the second result, wherein the first and second instruction blocks are compiled together at the compile time;
    determining, by one or more processors, execution possibilities of the first and second instruction blocks corresponding to the first and second results, respectively, for at least one branch in a program, wherein the execution possibilities are determined based on execution counts of the instruction blocks;
    determining, by the one or more processors, subject to the determined execution possibilities of the first and second instruction blocks, a sequence of the first and second instruction blocks; and
    loading, by the one or more processors, the first and second instruction blocks according to the determined sequence based on the execution possibilities.

2. The method of claim 1, wherein an execution possibility of the first instruction block is higher than an execution possibility of the second instruction block, the first instruction block and the second instruction block corresponding to a same branch, and wherein the loading the instruction blocks comprises:
    loading, by one or more processors, the first instruction block; and
    loading, by one or more processors, the second instruction block, wherein the first instruction block is to be executed prior to the second instruction block.

3. The method of claim 2, wherein the first instruction block comprises a condition instruction block, and wherein loading the first instruction block comprises:
    loading, by one or more processors, the condition instruction block as at least part of the first instruction block.

4. The method of claim 2, wherein the first instruction block comprises a content instruction block, and wherein loading the first instruction block comprises:
    loading, by one or more processors, the content instruction block as at least part of the first instruction block.

5. The method of claim 4, wherein loading the first instruction block further comprises:

in response to determining there is no prestored condition instruction block related to the content instruction block, generating, by one or more processors, a condition instruction block for the content instruction block; and loading, by the one or more processors, the generated condition instruction block as at least part of the first instruction block.

6. The method of claim 5, further comprising:

obtaining, by one or more processors, a logic expression which is logic negation of logic expressions related to prestored condition instruction blocks, wherein the condition instruction block for the content instruction block is generated according to the obtained logic expression.

7. The method of claim 1, further comprising:

loading, by one or more processors, one or more jump instructions, wherein the one or more jump instructions are determined based on the length of instructions to be skipped.

8. The method of claim 1, wherein the execution possibilities are further determined based on history executions of the program.

9. A system comprising:

a processor;

a computer-readable memory coupled to the processor, the computer-readable memory comprising instructions that when executed by the processor causes the processor to perform a method comprising:

compiling, at a compile time, a first instruction block corresponding to a first result;

compiling, at the compile time, a second instruction block corresponding to a second result, the first result different from the second result, wherein the first and second instruction blocks are compiled together at the compile time;

determining execution possibilities of the first and second instruction blocks corresponding to the first and second results, respectively, for at least one branch in a program, wherein the execution possibilities are determined based on execution counts of the instruction blocks;

determining, subject to the determined execution possibilities of the first and second instruction blocks, a sequence of the first and second instruction blocks; and loading the first and second instruction blocks according to the determined sequence based on the execution possibilities.

10. The system of claim 9, wherein an execution possibility of the first instruction block is higher than an execution possibility of the second instruction block, the first instruction block and the second instruction block corresponding to a same branch, and wherein the loading the instruction blocks comprises:

loading the first instruction block; and loading the second instruction block, wherein the first instruction block is to be executed prior to the second instruction block.

11. The system of claim 10, wherein the first instruction block comprises a condition instruction block, and wherein loading the first instruction block comprises:

loading the condition instruction block as at least part of the first instruction block.

12. The system of claim 10, wherein the first instruction block comprises a content instruction block, and wherein loading the first instruction block comprises:

loading the content instruction block as at least part of the first instruction block.

13. The system of claim 12, wherein loading the first instruction block further comprises:

in response to determining there is no prestored condition instruction block related to the content instruction block, generating a condition instruction block for the content instruction block; and loading the generated condition instruction block as at least part of the first instruction block.

14. The system of claim 13, wherein the method performed by the processor further comprises:

obtaining a logic expression which is logic negation of logic expressions related to prestored condition instruction blocks, wherein the condition instruction block for the content instruction block is generated according to the obtained logic expression.

15. A computer program product comprising a computer readable storage medium having program instructions embodied therewith, the program instructions executable by a processor to cause the processor to perform actions of:

compiling, at a compile time, a first instruction block corresponding to a first result;

compiling, at the compile time, a second instruction block corresponding to a second result, the first result different from the second result, wherein the first and second instruction blocks are compiled together at the compile time;

determining execution possibilities of the first and second instruction blocks corresponding to the first and second results, respectively, for at least one branch in a program, wherein the execution possibilities are determined based on execution counts of the instruction blocks;

determining, subject to the determined execution possibilities of the first and second instruction blocks, a sequence of the first and second instruction blocks; and loading the first and second instruction blocks according to the determined sequence based on the execution possibilities.

16. The computer program product of claim 15, wherein an execution possibility of the first instruction block is higher than an execution possibility of the second instruction block, the first instruction block and the second instruction block corresponding to a same branch, and wherein the loading the instruction blocks comprises:

loading the first instruction block; and loading the second instruction block, wherein the first instruction block is to be executed prior to the second instruction block.

17. The computer program product of claim 16, wherein the first instruction block comprises a condition instruction block, and wherein loading the first instruction block comprises:

loading the condition instruction block as at least part of the first instruction block.

18. The computer program product of claim 16, wherein the first instruction block comprises a content instruction block, and wherein loading the first instruction block comprises:

loading the content instruction block as at least part of the first instruction block.

19. The computer program product of claim 18, wherein loading the first instruction block further comprises:

in response to determining there is no prestored condition instruction block related to the content instruction block, generating a condition instruction block for the content instruction block; and loading the generated condition instruction block as at least part of the first instruction block.

\* \* \* \* \*